Inventor
Paul Eisler
By
Dowell & Dowell
Attorneys

Feb. 7, 1961 P. EISLER 2,971,176

PRODUCTION OF ELECTRICAL COMPONENTS FROM METAL FOILS, SEMI-CONDUCTORS AND INSULATING FILMS OR SHEETS

Filed Jan. 16, 1956

2 Sheets-Sheet 2

Paul Eisler Inventor

By Dowell & Dowell Attorneys 2,971,176

PRODUCTION OF ELECTRICAL COMPONENTS FROM METAL FOILS, SEMI-CONDUCTORS AND INSULATING FILMS OR SHEETS

Paul Eisler, 57 Exeter Road, London, England

Filed Jan. 16, 1956, Ser. No. 559,370
10 Claims. (Cl. 338—314)

This invention relates to the production of electrical components from metal, semi-conductor, insulating films or sheets.

It is now well known that the conductive portion of electric and magnetic circuits may often with advantage be made from metal foil, or resistant material such as graphite compositions, mounted upon an insulating base; and methods have been developed and described in, for instance, British Patent specifications Nos. 639,178 and 690,691, by which the conductive pattern may be produced from the sheet by a process of printing and etching.

It has been found that such components made apparently in the same way from the same materials, differ from one another to an extent sufficient to be of significance in circuit components in which high precision of stability over long periods is required.

In many cases the results of the normal electrical and mechanical tests on the various circuit components reveal not only that important electrical and mechanical properties are less favourable and less uniform than expected but also that they vary in time.

This variation in time is experienced as a deficiency from the desired degree of fatigue endurance and stability. It is the object of the present invention to achieve a smaller degree of variation of the properties of the circuit components both in time and from the optimum obtainable.

Various measures have been proposed to keep such variations down, including the drawing up of standard specifications for materials and component parts as well as ever-tightening prescriptions of tolerances of mechanical dimensions and chemical composition of the components. Unfortunately there is still not enough known of the nature of fatigue endurance and stability (and some other properties as well) to enable comprehensive principles of construction of electrical components to be deduced. Hitherto, efforts to achieve improvements in stability and fatigue endurance have been directed to the provision of better corrosion-resistant surface coating or of better insulation; the better control of chemical purity or composition; the design of metal or semi-conducting parts firmly fixed to strong robust insulators. The use of heavy, rigid, often ceramic insulating bases for small electrical components is probably partly due to these efforts.

The components with which the present invention is concerned are made from thin metal foil, thin insulating films or sheets, and sometimes also layers of semi-conducting material. Efforts such as those just enumerated are not applicable or do not achieve a sufficient improvement with such materials and the present invention aims at reducing the variation of important properties of such circuit components from the optimum obtainable both in magnitude and in time. This includes both aberrations from the optimum among a number of nominally like components and the variation of a property in any single component over a period of time in which it is subjected to repeated loads. The variation includes breakdown. Primarily, the present invention aims at improving the stability of important properties and the fatigue resistance of the components and at the same time improving the uniformity of these properties near the optimum value obtainable for a production run.

The present invention sets out to achieve its object by selection or control of the crystal structure of the foil from which a component is to be formed or patterned, by ensuring that the foil is substantially free from internal stresses and has at least one surface smooth—and preferably polished—so as to be free from surface irregularities, whilst the principal direction of current flow or magnetic flux in at least the major part of the component is associated with the preferred orientation of the crystal structure.

Maximum fineness of grain and degree of grain interlock should also be present in the foil, but where the attainment of some characteristics is detrimental to other desired characteristics—e.g. electrical conductivity—an optimum compromise is adopted in which each characteristic is exhibited to the highest possible extent in the presence of the others and having regard to the purpose of the component.

In the materials as normally supplied for the manufacture of electrical or magnetic components from foil, there is a lack of uniformity not merely as between one batch of material and another, but within the same sheet.

Two principal classes of non-uniformity in properties have been discovered. The one is anisotropy, particularly in rolled foil. Doubtless because successive rolling operations are always in the same direction, the properties of the foil in the direction of rolling may be widely different from its properties in a direction transverse to that of rolling. The other is a difference between the properties of the surface layers and the properties of the interior of the foil—a difference which can be of importance seeing that foil conductors are characteristically of large surface area compared with their bulk. Similar differences can arise in insulating materials, doubtless due in general to the process of manufacture.

Many variations in the properties of a particular material, and, indeed, the differences in properties between different materials of the same class—such as rolled foil and electrolytically deposited foil—can be shown to be due to differences in their crystalline and granular structure. For example, in rolled foil made from an alloy of copper and nickel, the crystals are of the cubic face-centred type, and during the process of rolling of the foil they tend to set with the body diagonal plane, i.e. the crystal plane whose Miller indices are (110), parallel to the plane of rolling, and the [112] direction lying in the direction of rolling.

The above-described orientation of crystals by the rolling pressure is not uniform throughout the cross-section of a foil; it is more marked towards the middle of the foil thickness than in the surface layers. There is thus a variation of structure over the cross-section of the foil. Moreover, variations over the cross-section and over the area of the foil may occur together; a smooth foil surface showing no marks of rolling may be underlain by knots of heavy stress a few ten-thousandths of an inch below the surface.

Electrolytically deposited copper foil does not show the anisotropy characteristic of rolled foil. Its structure may be laminated or striated, or it may be columnar, and of varying degrees of fineness.

The properties of insulating sheet, for example its dielectric strength, are also variable; in extruded or expanded plastic films they vary from one direction to another in the plane of the film. Where the insulating sheet incorporates a textile fabric the properties vary in relation to the run of the warp and weft.

From the study of the foil structure described above it becomes clear that the optimum foil analysis as well as the foil properties will be different for various types of component and various foils.

For hard rolled foil of most metals it has been established that electrical conductivity is higher in the direction of rolling than across the width of the foil. As rolling creates an orientation of the grains of the foil, a relation can be established between conductivity and the direction in which the current flows through the majority of the crystals in the foil.

Electrical conductivity, however, is by no means the only property which may vary with direction. Anisotropy of the foil is revealed in variations of the temperature co-efficient of resistence, the co-efficient of thermal expansion, heat conductivity, thermal e.m.f., magnetic susceptibility, Young's modulus, the modulus of rigidity, yield point, and the rate of solution in a chemical reagent such as an etching solution; and yet other properties which may matter in particular electrical or magnetic components. While from this finding some guidance can be got to achieve some optimum properties in a foil conductor, the obtaining of the minimum variations from these properties in magnitude and time (their uniformity and stability) is not apparent.

The present invention follows from the discovery that in a crystal, or in a polycrystalline aggregate such as a foil which has a predominant orientation of its crystals, the minimum variations are in the direction of those crystal planes which have the maximum density of atomic population.

Accordingly, maximum fatigue resistance and stability of the desirable properties (such as conductivity or resistivity, temperature co-efficient of resistance, etc.) in a foil component are achieved by arranging that the conductor of the component is made from such foil and such parts of the foil that it exhibits ideally the following five structural characteristics:

(*a*) freedom from internal strains, which is achieved by stress relief or further heat treatment of the foil;

(*b*) maximum degree of coincidence of direction of the principal current flow and the direction of crystal planes in the foil in which there are most atoms per unit area;

(*c*) minimum grain size; this, however, is not always conductive to the optimum for other physical properties;

(*d*) maximum smoothness of at least one—initially uninsulated—surface of the foil;

(*e*) maximum degree of interlocking and bonding of the grain structure, both internally and to a "stable" insulator.

Characteristic (*d*)—surface smoothness—can be obtained by either mechanical, chemical, or electrochemical polishing methods already well-known per se. All surface irregularities should be removed, whether projections or indentations, and the roughness normally provided for facilitating adhesion of an insulating layer or of adhesive printer's ink must also be removed. A mechanical polishing process generates compressive stresses in the actual viscous layer produced which are beneficial in promoting fatigue resistance but tend to reduce stability. A compromise between these two characteristics may be necessary. The smoothing process follows the stress relief of the foil.

The above five characteristics are listed in the approximate order of preference. It is scarcely possible to achieve all five characteristics in any foil otherwise suitable for a particular component. The size and configuration of the foil conductor, and the fact that our ability to orientate crystals is generally limited to either parallelism or random, often necessitate a compromise or the disregarding of one of the above factors, as will be seen later.

Various ways in which the invention can be put into effect will now be particularly described with reference to the accompanying drawings in which.

Figure 5A:
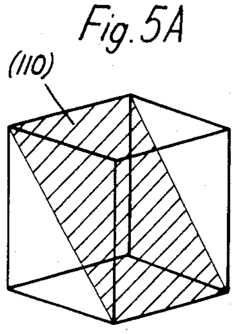
Figure 6:
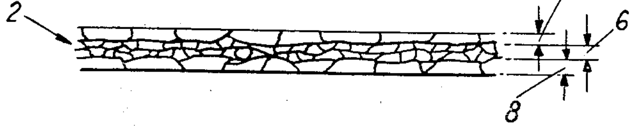

Figures 5A and B illustrate a cubic crystal lattice showing the (110) and (111) planes; and Figure 6 is a cross-section of a foil after a final rolling and before the final thinning operation has been completed the relative grain sizes being exaggerated for purposes of illustration.

Figure 1:
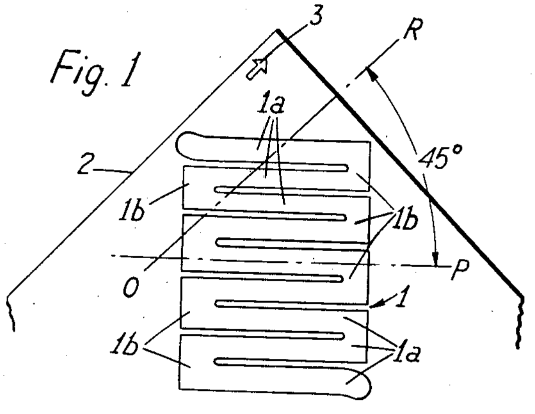
Figures 1 and 2 show parallel line patterns for small resistances.
Figure 2:
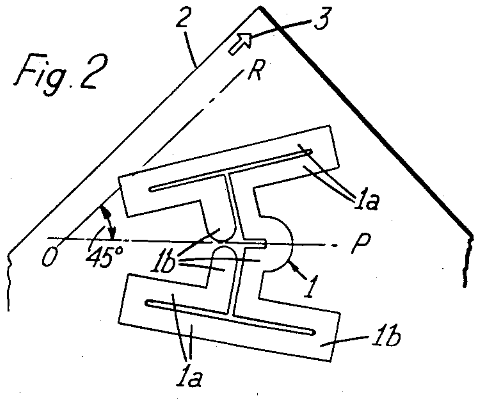
Figure 3:
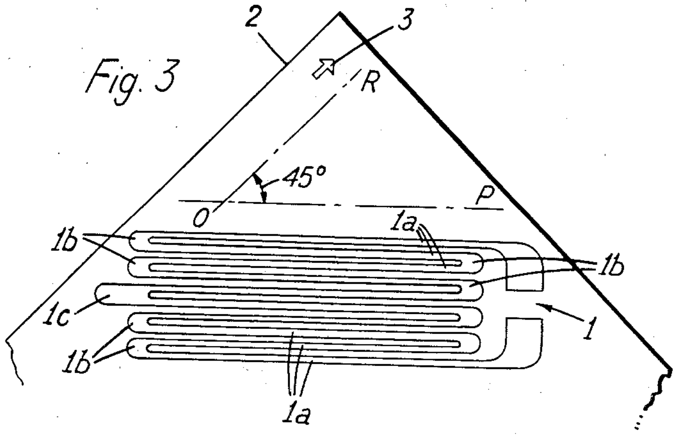
Figure 3 shows a strain gauge resistance.
Figure 5B:
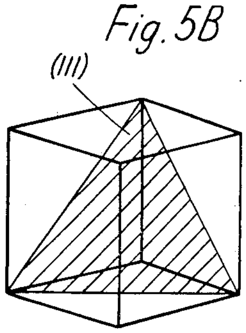

Referring first to Figures 1–3, a sinuous conducting path 1 forming the circuit component is laid out on a sheet of hard-rolled cupro-nickel foil, the crystal structure of which is of the face-centred cubic type. Study of the crystal lattice by X-ray diffraction analysis shows that the maximum density of atoms per unit area occurs in face-centered cubic crystals in the (111) crystal plane, and in the anistropic hard-rolled foil the direction of this plane lies at approximately 45° to the rolling direction (see Figures 5A and 5B). The relative atomic populations of the planes (100), (110) and (111) are in the ratios 8:12:15, and slip planes 6:5:8.

In the patterns of Figures 1 and 3, all the longer parts 1*a* of the sinuous conducting path 1 lie parallel to the direction OP, whilst the parts 1*b* are much shorter and lie at right angles to this direction. In Figure 2, the longer parts 1*a* are at a slight angle to the mean direction OP, and the shorter part 1*b*, some of which are of greater extent than those in Figures 1 and 3 but whose total length is still small lie at a larger angle to the mean direction OP. Hence the principal direction of conduction in all three cases lies in, or nearly in, the direction OP, and the patterns 1 are accordingly laid out with the direction OP at 45° to the longitudinal rolling direction OR of the sheet of foil 2, as indicated on the sheet of foil itself by the arrow 3. In Figure 3, one short part 1*c* is of greater width than the other corresponding parts 1*b*. This arrangement can be adopted to minimise the proportionate effect on the overall stability or calibration of the component by virtue of the fact that the direction of current flow is transverse to the preferred orientation of the foil crystal structure.

If the length of the longer parallel conductor lines 1*a* is very great, it becomes impossible to lay the pattern 1 at 45° to the longitudinal foil axis OR. The pattern 1 must then be laid with the direction OP in the direction of the foil axis OR. In this case condition (*c*) above is not strictly adhered to with hard rolled foil of the face-centred cubic system and a compromise solution is effected. However, it is not impossible to create, say, copper-foil conductors of great length which strictly comply with condition (*c*). One way in which this may be done is to electroform a foil conductor on a master shape made, for example, from a drawn wire and then flattened. Conditions can be arranged in this way so as to ensure that the grains in the electroformed foil pattern lie in the direction of current flow regardless of the configuration of the conductor. The foil pattern is subsequently transferred to an insulating base—preferably after heat treatment to relieve internal stresses.

Magnetically conductive patterns will be made from a foil of magnetic material such as a silicon iron alloy. Silicon iron foil is built of body-centred cubic crystals which in hard rolled foil tend to have their cube edges parallel to the rolling direction, and this is the direction of greatest magnetic permeability. Hence elongated patterns of magnetic lines should be made to run in the direction of rolling. If it is desired to print these lines at right angles to the direction of feed through the printing machine, then the foil should be attached in sheets to a web or tape of insulation with the direction of rolling transverse to the length of the insulation.

Figure 4:
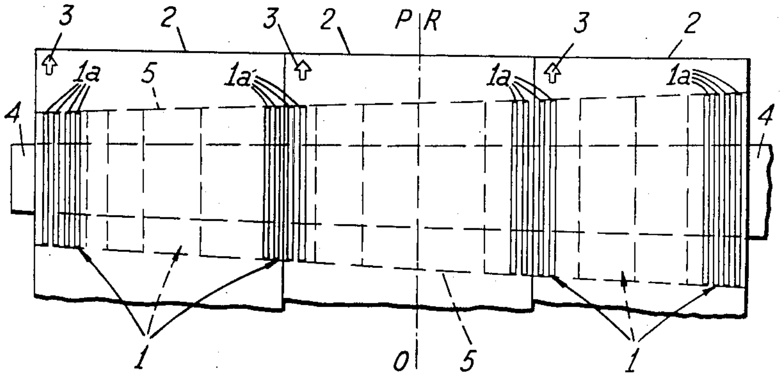
Figure 4 illustrates a method of making a magnetic core pattern component.

Figure 4 shows the layout of a pattern 1 for use as the core of a ring-type transformer. In this figure, three sheets of silicon iron foil 2 are placed side-by-side with their directions of maximum atomic population parallel as shown by the arrows 3 on each foil. An insulating layer or strip 4 of tapered width is secured across the foils 2, its minimum width being equal to the axial height of the periphery of the transformer windings. The length of the pattern 1 in the direction of length of the insulating strip 4 is equal to a multiple of the circumferential length of the winding periphery, depending on the number of layers of core required to give the necessary iron cross-section. The core pattern 1 is printed as a number of closely spaced parallel lines 1*a* each extending in the direction of the arrows 3, so that the principal direction OP of magnetic flux in the core is coincident with the direction of rolling OR of the foil. The finished pattern presents a large number of separate parallel silicon iron strips held by the tapered strip 4.

The "envelope" 5 of the lines 1*a* is also tapered to permit successive layers of the core to overlap as the ends of the lines 1*a* beyond the edges of the insulating strip 4 are lapped over the ends of the ring windings and into the central hole through the transformer. When the core pattern has been wrapped around the windings and lapped around the ends, the whole assembly may be clamped between end plates.

Foil for the printing of magnetic patterns where maximum susceptibility is desired has preferably its whole thickness filled by single grains. A stress-relieved foil of a medium grain size is therefore selected. Its thickness is then reduced by electrolytic or chemical treatment to the thickness of single grains. Where minimum hysteresis loss is the principal desideratum, a very thin fine-grain hard rolled foil should be bright annealed until the grains grow to the thickness of the foil.

In the process according to the present invention for the manufacture of components, and particularly where manufacture is carried out on a mass production scale, it is desirable that the foil should be marked in accordance with one or more of the five requirements (*a*) to (*e*) given above. For example, the direction of rolling of the metal foil 2 is shown in Figures 1–4 by the arrows 3 printed in one corner. Determining the optimum layout of the pattern 1 on the foil 2 involves a knowledge of the direction OR of rolling which in the past has commonly been lost sight of in the manufacture of a foil and insulation laminate. The foil 2 or the laminate (that is, the foil with its insulating film attached) should be marked at the time of manufacture to indicate the direction of rolling of the foil and the direction of extrusion of the insulating film, or like data; annealed foil lamiates should be distinctively marked so that they may be known to be approximately isotropic. For if the conductive pattern 1 is to be printed, the printer, in the absence of other guidance, will set the pattern for the best advantage in printing—for instance, so as to get as many patterns as possible upon a given area; so that long conductor lines run in the direction of feed in the case of cylinder printing machines; and so on. It may, therefore, be desirable to set the foil 2 in sheets upon an insulating web so that the direction of rolling of a cubic-face centred foil is at about 45° to the length of the web.

Apart from, or in addition to, such marking, it is desirable to relate the setting of the foil 2 upon its insulating web to the use in view. Thus, consideration must be given to the question of whether the component is likely to be exposed to large temperature fluctuations, and hence whether the conducting pattern 1 is in danger of being subjected to mechanical stress due to inequalities of thermal expansion between the foil and the insulating film or web. Where such conditions are likely to obtain, a laminate according to the present invention has the direction of minimum linear thermal expansion of the film predetermined, and the film and the foil are secured together so that optimum fatigue resistance or stability are obtained. In many applications of such a laminate, the directions of maximum atomic population in the foil and minimum linear thermal expansion in the film are coincident.

Especially exacting requirements are met with in the manufacture of components from resistance alloy foils. Strain gauges, temperature sensitive gauges, and other types of gauge, as well as standard resistors, are required to be of high stability, to be uniform in respect of the change of resistance with temperature, or with strain, as the case may be, and to withstand fatigue. All these properties are greatly dependent on the physical structure of the metal used. It should be a fine-grained, hard-rolled, stress-relieved foil. It should not be rolled to the final thickness desired. The last rolling stage should leave the foil thick enough to allow for selection of a layer of the cross-section for the final foil, and the thick foil then be reduced to the final thickness, for example by chemical or electrochemical thinning and polishing operation which simultaneously satisfies characteristic (*d*) above. If preferred, a mechanical thinning and polishing may be substituted.

Variations of the properties of the foil throughout its cross-section govern the way in which this thickness reduction is effected; for it is not necessarily the middle layer 6 (Figure 6) of the section which should be used since that may be subject to heavy local stresses, whilst the surface layer 7 or 8, where the grain size is a little greater and the orientation is not so marked, may be preferable. Thus, the best compromise must be reached in cases where the several individual characteristics (*a*) to (*e*) are not simultaneously attainable.

Isotropic foils may be found more satsifactory for non-linear patterns, and would normally be selected, according to the present invention, for such a purpose after a determination of their structure in relation to the desired properties of the component. It is preferred to mark such foils, in accordance with a feature of the invention, by a distinctive character such as a circle.

Metal foils for use in components by the method according to the invention are preferably of a thickness not greater than 0.001″. Such a foil has a higher current carrying capacity for the same temperature rise under the same conditions of heat dissipation than a round wire of the same cross-section and specific conductivity. A marked saving in weight can thus be realised by using such foils in place of wires, whilst stability of a foil conductor can be materially improved by the process of the present invention. Like considerations of optimum grain structure and orientation of the planes of maximum atomic population apply to semiconductors as have been described above with reference to metallic conductors.

Typical components to which the invention may advantageously be applied include high stability resistors; fatigue-resistant components such as may be required for temperature or strain gauges; H.F. magnetic cores; and cables which consist of one or more lengths of tape.

Throughout this specification the expression "a conducting circuit component" or "an electrical component" denotes a part of the path of the electric current or magnetic flux of a manufactured electric or magnetic circuit.

The expression "the principal direction of conduction" in the component denotes the direction of this electric current or magnetic flux in the component.

The term "laminate" denotes any sheet material consisting of two or more layers of different substances however produced.

What I claim is:

1. A new article of manufacture which comprises: an insulating base; a stress relieved electrically conductive surface element of less than 0.001 inch thickness having at least one smooth polished face whereby surface irregularities are minimized, said element being bonded to said insulating base, and having one direction wherein the number of atoms per unit area is a maximum, said element presenting a resistive path for electric current the greater part of which extends in said one direction.

2. A process for producing a printed circuit resistor which comprises: preparing a foil sheet having a minimum crystal grain size of a high degree of grain interlock; reducing the thickness of said foil sheet below 0.001 inch whereby the cross-section of said foil sheet consists of not more than three single crystal grains; stress-relieving a foil; removing surface irregularities from at least one face of said foil; applying rolling pressure to said foil to render said foil sheet anisotropic whereby a majority of said crystals in said foil are oriented so that the crystal planes, in which the maximum number of atoms per unit area reside, are codirectional; and aligning the majority of said crystal planes, having the greatest atomic count per unit area, along the principal direction of conduction in said resistor.

3. A printed circuit including an electrically insulating base and an electrically conductive foil pattern on said base having elongated substantially parallel sections forming a resistive element in the path of the current in said circuit and the foil being of polycrystalline structure with a substantial fraction of the crystal planes which have a maximum number of atoms per unit area lying in the length direction of said elongated sections.

4. The printed circuit of claim 3 characterized in that said foil has a thickness of less than 0.001 inch.

5. A printed circuit element which comprises an insulating base and a rolled metallic foil pattern thereon presenting a series of elongated sections of an electrical resistor, said sections being disposed at an angle of about 45° to the direction of rolling of the foil.

6. An article as set forth in claim 1 wherein said surface element is composed of grains of minimum size which have a high degree of interlocking.

7. The method of improving the fatigue resistance and stability of response of a repeatedly loaded electric circuit incorporating a printed circuit resistor which includes the steps of providing terminal connections to the resistor, and setting the conductive pattern of the printed circuit resistor with its principal direction of conduction between said terminal connections extending substantially in the direction in which the maximum number of atoms per unit area of the material of the conductive pattern reside.

8. The method set forth in claim 7 wherein the conductive pattern of the printed circuit resistor is mounted on an insulating support having its direction of minimum thermal-co-efficient of expansion extending in the principal direction of conduction.

9. The method of improving the fatigue resistance and stability of response of a repeatedly loaded electric circuit which includes the steps of rolling a metallic foil to render it anisotropic with a preponderance of the planes in which the atomic population is greatest per unit area extending in the same direction, and patterning the foil to form a resistive part of the circuit having its principal direction of current flow extending in the direction of said codirectional planes.

10. A laminated material for the production of printed circuit resistors comprising a support of electrically insulating material and an anisotropic polycrystalline metal foil bonded to the support having a preponderance of the grains so disposed that the planes of greatest atomic population per unit area extend generally in the same direction, said laminated material also having means making said direction visually ascertainable as a step in the preparation of a printed circuit resistor.

References Cited in the file of this patent

UNITED STATES PATENTS

| | | |
|---|---|---|
| 2,046,717 | Bitter | July 7, 1936 |
| 2,112,084 | Frey | Mar. 22, 1938 |
| 2,356,044 | Foulkes | Aug. 15, 1944 |
| 2,441,960 | Eisler | May 25, 1948 |
| 2,662,957 | Eisler | Dec. 15, 1953 |
| 2,792,511 | Horstman | May 14, 1957 |

OTHER REFERENCES

Printed Circuit Techniques, November 15, 1947.

Elements of Physical Metallurgy, a book by Albert G. Guy Addison, Wesley Press, Inc., 1951, pages 136–146.

Tele-Tech., an article printed Unit Assemblies, pp. 38–40, 112, 114, 116, 118 and 120, June 1952.

Orienting Grains in Transformer Steel, General Electric Review, May 1953, page 13–16.